May 12, 1953  R. FORTUNE  2,638,309
COATED VALVE MEMBER
Filed Oct. 29, 1949  5 Sheets-Sheet 3

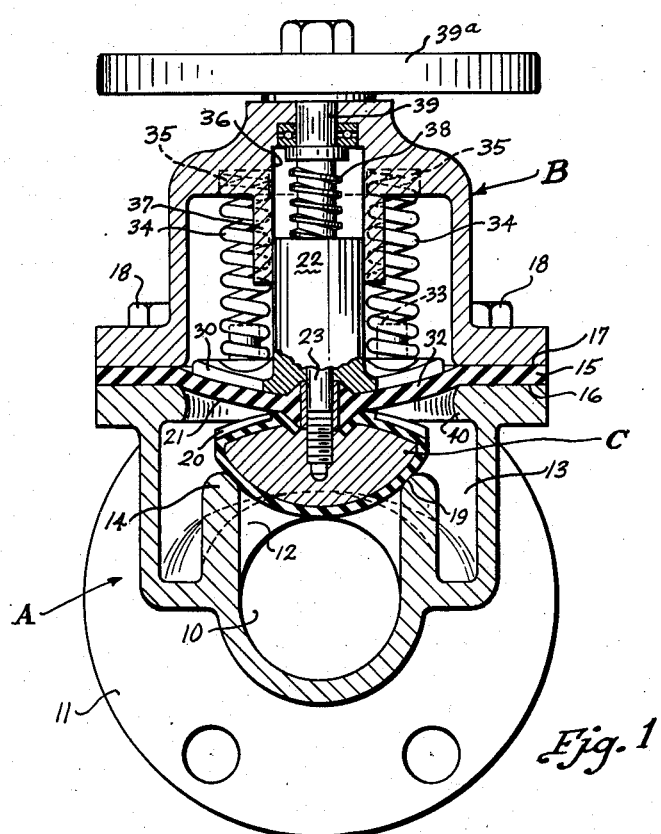
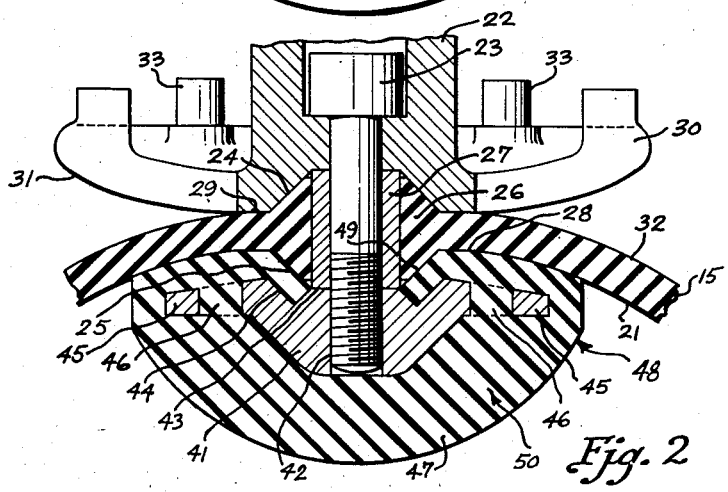

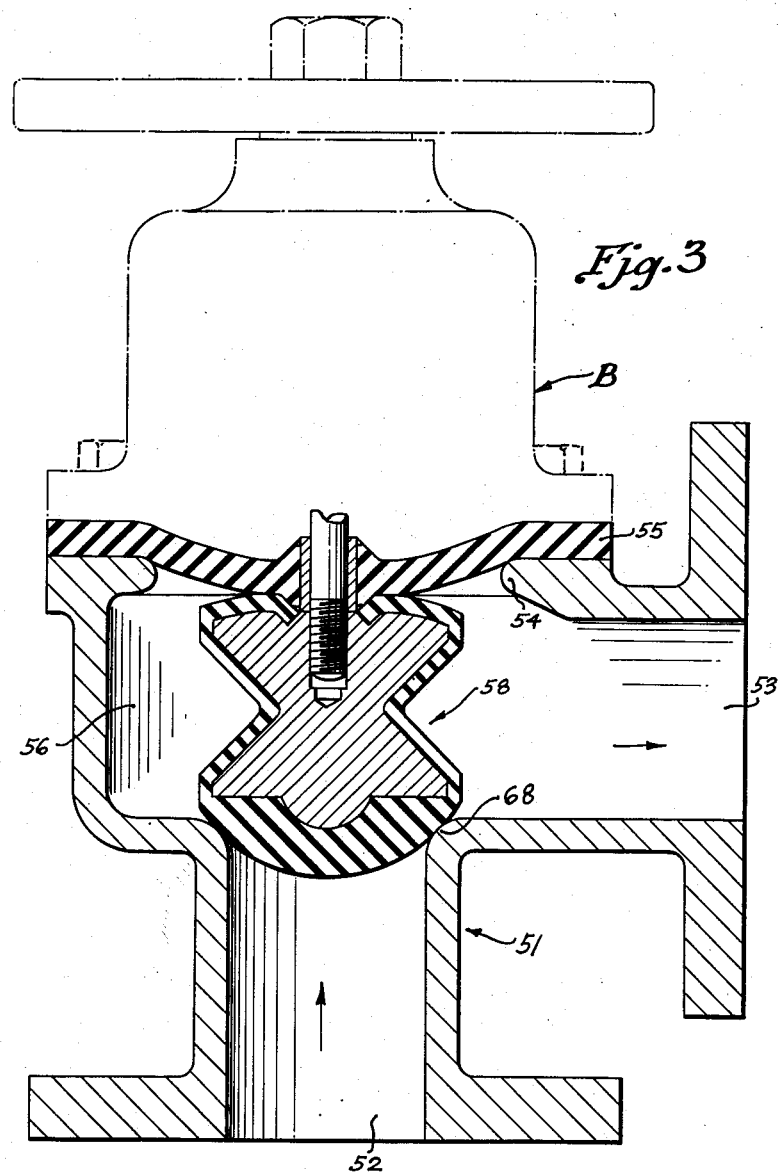

Inventor
RONALD FORTUNE
By: Featherstonhaugh & Co.
Att'ys

May 12, 1953 R. FORTUNE 2,638,309
COATED VALVE MEMBER
Filed Oct. 29, 1949 5 Sheets-Sheet 5

Inventor
RONALD FORTUNE
By: Fetherstonhaugh & Co.
Att'ys

Patented May 12, 1953

2,638,309

UNITED STATES PATENT OFFICE 2,638,309

COATED VALVE MEMBER

Ronald Fortune, Hamilton, Ontario, Canada

Application October 29, 1949, Serial No. 124,357

9 Claims. (Cl. 251—161)

This invention relates to a novel valve member for use in diaphragm valves or other valves which may be adapted for handling corrosive fluids and specifically to a valve member having an elastomer coating.

This application forms a continuation-in-part of my application Serial No. 31,117 filed June 4, 1948, which is a divisional application of my U. S. application Serial No. 514,344 filed December 14, 1943, since abandoned, and also forms a continuation-in-part of my application Serial No. 787,541 filed November 22, 1947.

Diaphragm valves up to the present time have largely been of a type wherein the diaphragm has formed a valve member by means of which the fluid flow through the body is throttled or completely shut off. In this type of construction the diaphragm has necessarily been squeezed between the faces of the valve body and the valve operating spindle and associated mechanism. Pinching or squeezing of the diaphragm between two solid members rapidly deteriorates the rubber or other flexible material of the diaphragm and more especially when the valve is closed for long periods or when the diaphragm is repeatedly opened or closed in daily service.

Many acids, oils or solvents are inherently destructive to rubber, synthetic and other fabricated materials and the life of these materials is more rapidly shortened when the diaphragm is caused prematurely to wear or deteriorate by being squeezed or compressed between two solid metal members such that fluids of the character specified more easily attack it. For this reason it is more desirable to employ a valve structure having a separate valve member. This obviates the main disadvantage of the more usual type of diaphragm valve for corrosive fluids since it avoids the squeezing of the diaphragm between two solid members. However, when the valve is employed for controlling fluid flow wherein the fluid carries particles in suspension or entrained solids, the latter may tend to lodge between the diaphragm and the valve member particularly when the valve member is moved from the closed to fully open position.

It is therefore an object of the invention to provide a valve member having a rigid core, by which the same may be mounted, encased within a coating or cover which is resistant to damage by corrosive fluids and abrasion by particles carried in suspension by the fluid passing through the valve.

Another object of the invention is to provide a valve member of this novel class wherein the rigid core forms a substantial portion of the body of the valve member and the resilient covering is in the form of an elastomer extending about the rigid core and completely isolating the latter from corrosive action of fluids.

A further object of the invention is to provide a valve member as before, in which the means for mounting the valve member may embody a socket for receiving a threaded stud or an integral stud extending from the valve member but which in either case includes an annular shoulder extending about the mounting means which is adapted to be tightly sealed against the diaphragm in the central region of the latter, this sealing being effective at all positions of the valve member during valve action.

A further object of the invention is to provide a valve member having an elastomer coating extending about a rigid core wherein the core has passages, sockets, recesses, or suitable indentations forming means for accommodating an anchoring portion of the elastomer material for locking the coating to the rigid core.

A still further object of the invention is to provide a valve member comprising a rigid core, an elastomer coating, and means rising from the upper surface of the valve member to provide a construction which will avoid clogging particularly in the case where solid materials may be suspended in the fluid passed by the valve.

A still further object of the invention is to provide a valve member having means rising from the upper surface thereof as before, including resilient webs therebetween acting as flexing areas to more efficiently discharge obstructing material from the upper surface of the valve member between the latter and the adjacent diaphragm. This form of valve member may include pressure balancing means therewithin such as a pressurized air chamber in the rigid core communicating with the inner surface of the free flexing areas.

With these and other objects in view the invention generally comprises a coated valve member in the form of a rigid core including means for mounting the same, and means formed about the mounting means constituting the terminus of the elastomer coating effective for a sealing function in conjunction with a valve diaphragm.

Other objects of the invention will be apparent from a study of the following specification taken in conjunction with the accompanying drawings.

In the drawings,

Figure 1 is a sectional view of a through-type valve having a valve member of the invention mounted therein.

Figure 2 is an enlarged partial sectional view of a valve member, diaphragm and valve ram assembly wherein the valve member is of a modified form.

Figure 3 is a partial sectional view of a valve of the angle type illustrating the necessary modification of the valve member of this invention for service in a valve of this class.

Figure 4:
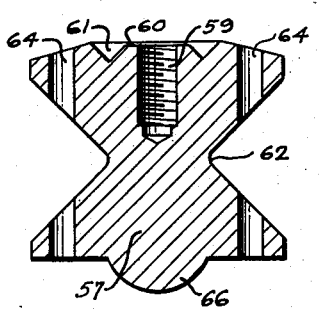
Figure 4 is a sectional view of the preferred type of rigid core for a valve member of the type shown in Figure 3.

Referring to the drawings and particularly to Figure 1, the letter A indicates a valve body having an inlet passage 10 extending from the mounting flange 11 to the intermediate communicating passage 12 between the inlet and outlet passages, the latter of which is not shown. A chamber 13 is formed in the valve body A and surrounds the nozzle 14 to enclose and define the passage 12. The chamber 13 in turn is defined and enclosed by the flexible diaphragm 15 which is employed as a seal isolating the bonnet B from the valve body A and clamped between the flanged surfaces 16 and 17 of the body A and bonnet B respectively, the assemblage being held together by suitable bolts 18. Fluid control is effected by means of a valve member C, the latter being mounted inwardly of the diaphragm 15 and centrally of the passageway 12 and being designed to move toward or away from the valve seat 19. The valve member C has an upper convex surface 20 designed to mate with the inner surface 21 of the diaphragm 15 when the valve is in the open position.

The valve member C is mounted from the slidable ram 22 preferably by means of the screw 23 which passes through an orifice at the base of the partially screw-threaded bore (not shown) of the ram and enters into threaded engagement with the valve member C. As is illustrated in more detail in Figure 2 a double union joint is formed between the ram and the valve member where the latter include female cone components or sockets in the form of recesses 24 and 25 respectively. The screw 23 therefore operates to lock oppositely projecting co-axial male component cones 26 in the form of central annular enlargements in the diaphragm 15 as shown, to form a co-axially opposed double union joint concentric with the central axis of the ram and valve member. Preferably, a separate pressure limiting bushing 27 surrounds the screw 23 in this central union area designed to prevent the diaphragm from being injuriously compressed but insuring a perfect fluid seal of particularly simple character and wherein the double union connection is fully protected by the base of the ram and the top central area of the valve member C. To this end the upper surface of the valve member preferably incorporates an annular sealing face 28 which co-operates with a similar annular sealing face 29 on the ram 22 to tightly grip the diaphragm about the annular central enlargement thereof. Co-operating sealing faces of this character are preferred in a valve member according to the invention whether or not the diaphragm 15 of the type having an enlargement 26 about the central hole therethrough is employed.

As disclosed in my prior applications referred to, the diaphragm is designed to be supported against pressure from within the valve body A during its closed position and in its movement to and from the closed position by means of a follower plate 30 which is preferably formed integral with the ram 22 and designed to constitute a circumferential projection extending radially from the lower end of the ram. The inner surface 31 of the follower plate is substantially convex and designed to mate with the concaved outer surface 32 of the diaphragm when the diaphragm is in the closed position as illustrated in Figure 1. Suitable posts 33 may be formed on the extremities of the follower plate to support compression springs 34 which rise to seat within the recesses 35 (see Figure 1) formed in the top of the bonnet B. The ram 22 is slidable in the bore 36 of the guide cylinder 37 and carries an internally threaded portion (not shown) designed for threaded engagement with the threads 38 of spindle 39 thereby assuring alignment of the ram in its movement between the extreme open and extreme closed positions. The arrangement tends to reduce the effort required at the handwheel 39a to close the valve by means of the compression springs which act to reduce the thrust load between the threads of the spindle and the ram and exert a residual mechanical compression within the bonnet.

Further means of reducing the effort required at the handwheel 39a in closing the valve against pressure is provided by the inwardly projecting annular ring or inwardly projecting flange 40 of the valve body designed inwardly to support the inner surface 21 of the diaphragm adjacent to its periphery, in effect therefore to reduce the total area of the inner surface 21 of the diaphragm projected against the pressure of fluid from within the valve thereby reducing the total pressure against the diaphragm in direct proportion to the reduction of the exposed surface area. This characteristic is followed also in the valve body formations in the angle valve of Figure 3 and the Y type valve of Figure 6 hereinafter to be described in more detail. In respect to the three general types of valves, however, the same bonnet may be employed, there being only necessary dimensional differences in the form of the valve member itself.

A valve member suitable for a through type valve is illustrated in Figure 2 and comprises a rigid core, preferably of metal indicated by numeral 41, having a threaded socket 42 designed to receive the screw 23. An annular pressure limiting seat 43 is formed about the socket 42 and more outwardly is formed an annular recess 44. A radially extending flange 45 of the core in the form shown has a plurality of orifices 46 cut therethrough. A protective elastomer covering 47 is moulded about the rigid core and extruded through the holes 46 to form the outer covering and contours of the valve member 48. The lower surface of the valve member is preferably spherical in shape, and the upper surface is formed arcuately to conform to the inner surface 24 of the diaphragm when the valve components are arranged for the full open position of the valve. By reason of the extrusion moulding of the moulding compound which results in an elastomer coating for the rigid core extruded through a plurality of holes in the flange 45, a mechanical anchorage for the coating of the valve member is provided which would otherwise be chemically bonded by cemented adhesion. There is a further feature of definite pertinence here, however, in that a centrally located recess 49 in the valve member coating is provided so that the coating is locked into the rigid core when the valve member is assembled with the diaphragm and ram as illustrated in Figure 2. The core of the valve member is effectively protected from attack of corrosive fluid handled by the valve by virtue of the double union joint feature disclosed. In respect to the assembly of the components of the ram, diaphragm, and valve member, however, the annular sealing or clamping face 28 is a feature of importance as previously described.

It will be observed in Figure 2 that the valve member 28 in the formation of the rigid core 41 allows a substantial body of the elastomer covering in the region 50 thus to provide longer wearing life against erosion, abrasion and destructive fluids at elevated temperatures. The coating is therefore thickest at the region where the valve member contacts the surfaces of the valve nozzle which it engages. This feature also provides a desirable degree of cushioning for resistance to shock.

Figure 5:
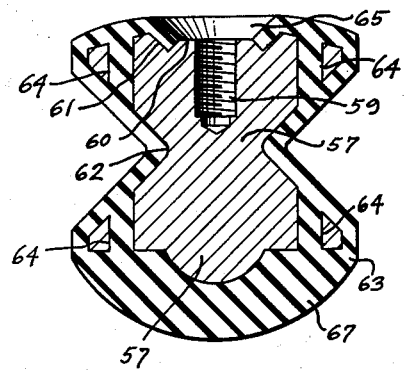
Figure 5 is a sectional view of a complete valve member of this preferred type.

In Figure 3 an angle type valve body 51 is shown having an inlet passage 52 and an outlet passage 53. It will be observed that the body in this case also has an inwardly extending ring or flange 54 designed to reduce the exposed area of the diaphragm 55 to pressure. This is a preferred feature disclosed in my prior applications. The bonnet B fastens to the valve body 51 in a similar manner to that indicated in the type of valve illustrated in Figure 1. Due to the nature of the fluid chamber 56 in this type of valve, however, a modification in the form of the valve member is provided. Thus referring also to Figures 4 and 5, the rigid core 57 of the valve member 58 has a threaded socket 59 surrounded by an annular seat 60 having an annular recess 61 thereabout. The central region 62 of the valve member is of reduced sectional area so that the valve member in its final form will allow more free flow conditions through the valve. An elastomer coating 63 is shown formed about the core 57 in Figure 5. In this case the covering material is extruded through suitable holes 64 in the core in order to lock the covering to the latter. It will be noted that the outer covering 63 terminates in the form of a conical recess 65 about the threaded socket 59 and its associated pressure limiting seat 60. The lower extremity of the rigid core 57 incorporates a semi-spherical projection 66 which serves to resist lateral movement of the moulded coating 63 when the lower diffusing surface 67 of the valve member is pressed into engagement with the central orifice controlling seat 68 of the body.

Figure 6:
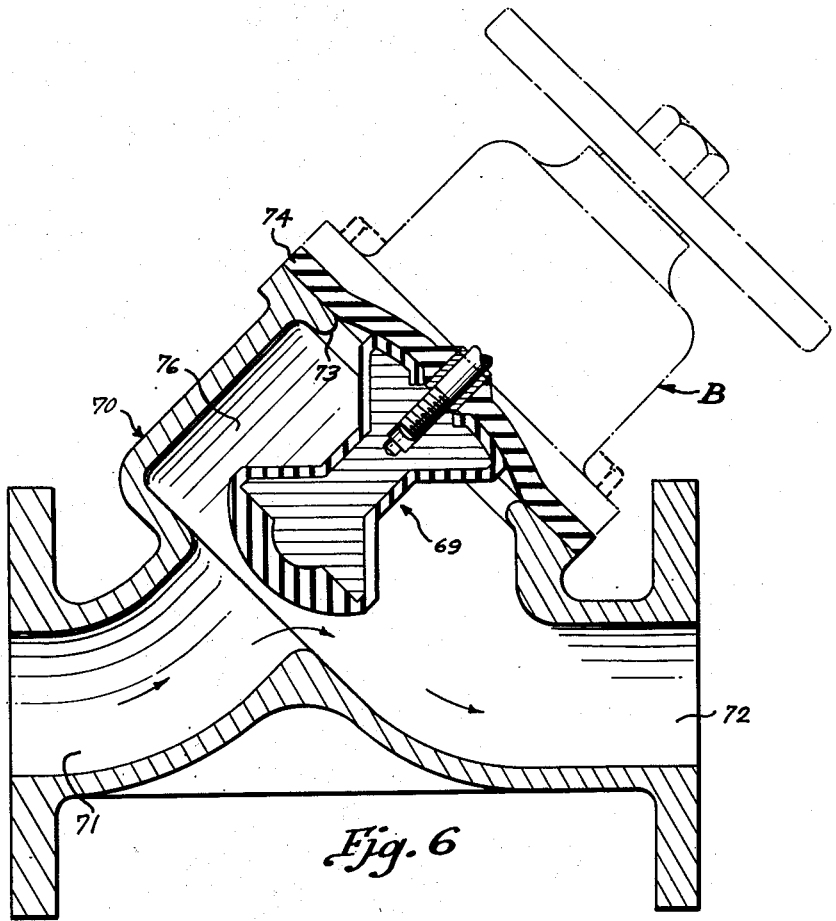
Figure 6 is a sectional view of a valve of the Y type illustrating modifications of a valve member according to the invention for installation in a valve of this class.
Figure 7:
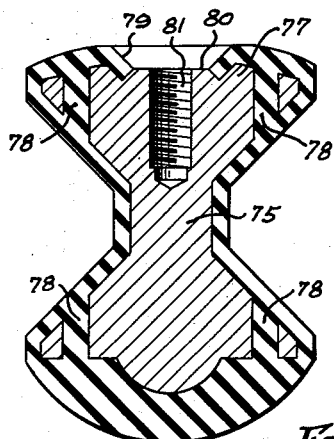
Figure 7 is an enlarged sectional view of the preferred structure of a valve member suitable for a valve of the type shown in Figure 6.

In incorporating a valve member of the invention in a Y type valve as illustrated in Figures 6 and 7 the body of the valve member is further elongated. The same bonnet B may be employed to carry the elongated valve member 69 within the Y type body 70 having inlet and outlet passages 71 and 72 respectively. In this case the valve body 70 also has an inwardly extending flange 73 limiting the exposed area of the diaphragm 74 to over-all pressure within the valve, thereby reducing stresses in the diaphragm due to pressure as compared with the conventional more exposed arrangement, this feature allowing interchangeability of bonnets for different types of valve body. In this case the rigid core of the valve member has an elongated central portion 75 or reduced diametric cross section, thus allowing substantial free flow in the chamber 76 since the valve coating is of comparatively even thickness about the sides of the valve member. In this case also the elastomer covering material is extruded through orifices within the rigid core 77 in the region 78 and the valve member has the characteristics of a conical recess 79 which extends inwardly towards the seat 80 annularly extending about the threaded socket 81.

It will be observed that the basic features of the valve member in the three different types of valves illustrated in Figures 2, 3 and 6 remain substantially identical in respect to the upper surface contour of the valve member for the support of the diaphragm and the lower orifice controlling diffusing seat or surface contour of the valve member. The valve member differs only in its length and in form to provide free flow conditions through the flow conducting chamber of the valve body. In respect to the three types of valves of any one size the bonnets are interchangeable along with the diaphragm and it is only necessary to supply different valve bodies and different valve members according to the type required.

In providing a valve member with an impervious coating of elastomer nature according to the invention, it should be noted that, aside from any cementing which may be employed, means is provided for insuring that the elastomer coating remains adhered to the rigid core. This factor is particularly important at elevated temperatures which may exceed the softening point of the cement and impair its adhesive properties. The coating material may be extruded into passages, sockets or other formations hereinafter referred to as recesses in the rigid core in order to lock the covering to the core, to ensure a tenacious mechanical bond. The mounting means for the core which may be in the form of a threaded socket and co-operating screw integral of the spindle or in some cases, a threaded stud extending from the rigid core may be surrounded by an annular recess into which the coating extends to form its terminus and serve in the clamping action for the sealing function in the formation of the double union connection between the ram, diaphragm and valve member previously discussed. In any case, some form of sealing face on the valve member should be provided in annular form about the mounting means whether it be in the form of an annular recess or a simple face, so that the corrosive fluid will not find its way to the rigid core.

Figure 11:
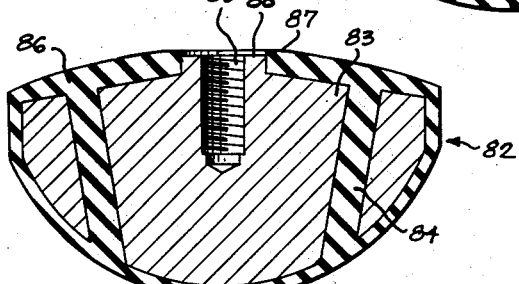
Figure 11 is a sectional view of a simple form of an elastomer covered valve member according to the invention.

Thus in Figure 11 a particularly simple type of valve member is provided in the form of a rigid core 83 having passages 84 therethrough to form a means of locking the covering material 85 to the core. The upper surface 86 of the valve member incorporates an annular sealing face 87 extending about the seat 88 of the core formed about the threaded socket 89. Preferably the thickness of the covering in the region of the annular sealing face 87 is greater than the depth of the seat 88 so that the covering in this region extends above the surface of the seat 88 to provide predetermined pre-compression of the elastomer coating in this region to more effectively promise the necessary sealing qualities.

Figure 9:
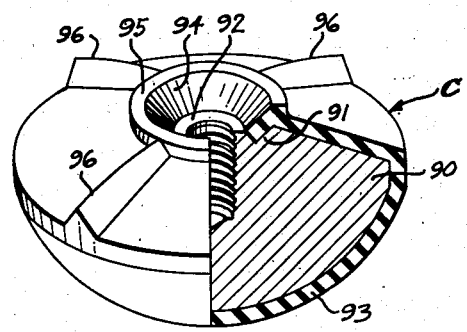
Figure 9 is a perspective view of a further modified form of valve member of the type shown in Figure 1 having means rising upwardly from the upper surface thereof.

Figure 9 discloses the valve member C of Figure 1 in more detail. The rigid core 90 is of simple form having a recess 91 and a pressure limiting shoulder 92. The elastomer coating or covering 93, extends about the rigid core and is formed to provide the conical recess 94 and annular sealing face 95. Diaphragm supporting members 96 in the form of radially and outwardly extending supporting arms or ribs rise from the upper surface of the valve member leaving therebetween comparatively generous clearances as between the valve member and the diaphragm when the valve is in the open position. This construction tends to obviate the lodging of impurities or the retention of acid or corrosive liquid between the valve member C and the diaphragm 15 when the valve member is only slightly open and provides a progressive engagement function of the diaphragm supporting members with the diaphragm as the valve is opened.

Figure 10:
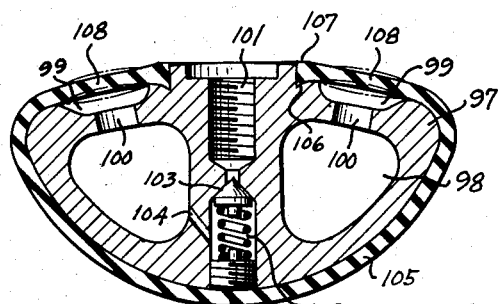
Figure 10 is a sectional view of a further modified form of valve member having free flexing areas including interior pressure control.

When the valve member is in a position where the valve is only slightly open for substantially long periods there can be a tendency for dense solids or sticky ingredients to cling to the upper surface of the valve member or to build up between this surface and adjacent surfaces of the diaphragm. This disadvantage is obviated largely by the convexed upper surface of the various forms of valve member illustrated herein and with the assistance of the velocity of fluid passing through the valve to shed solids into the flow. However, if such solids or sticky ingredients should adhere to or build up on this upper surface, they are accommodated by this valve without seriously affecting the efficiency of operation. In this connection, a further modified form of valve member for particularly difficult conditions is proposed herein and which embodies a pneumatic membrane or web preferably of an elastic substance such as rubber. One form of valve member having such characteristics is illustrated in Figure 10 wherein the rigid core 97 has an inner annular chamber 98 in communication with an annular channel 99 by suitable holes 100. The threaded spindle socket 101 communicates to a pressure chamber 102 by way of conventional check valve mechanism 103, the chamber 102 being in communication with the annular chamber 98 by way of a suitable passageway 104. An elastomer covering 105 extends about the rigid core 97 to terminate in the recess 106 to provide an annular sealing surface 107. The elastomer covering extending freely over the channel 99 forms a flexible membrane or web 108. In this construction the chamber 98 is pre-charged with air to cause a slight outward bulging of the web area 108 for a cushioning action. After the valve member is assembled air pressure is provided in the chamber 98 by way of the check valve 103. In this way, therefore, the valve member may be charged with air to provide for a desired internal pressure to accentuate the flexing action of the covering in the web area 108. The flexible web action will serve to positively project particles which may have lodged on the upper surface of the valve member therefrom during movement of the valve from partially open to full closed position.

As a result of this pneumatic construction of valve member any solid particles which may have been trapped between the valve member and the diaphragm will not restrict the full opening of the valve as the trapped ingredients become pocketed in the flexed portion or web 108 of the elastomer covering subtending the annular channel 99. The lodged particles will be automatically released immediately the valve member and inner surface of the diaphragm are parted due to the reflexing or opposite flexing movement of the covering.

Figure 12:
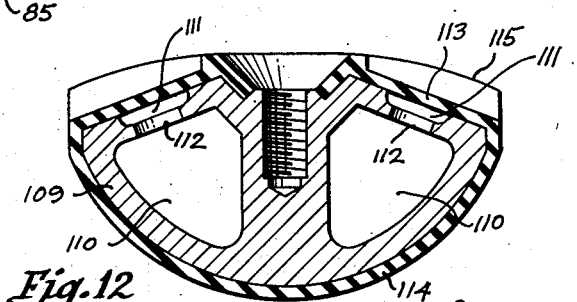
Figure 12 is a sectional view of a further modified form of the type of valve member shown in Figure 9.

The pneumatic principle may be adapted in a limited manner to a valve member form of the type shown in Figure 9 by modifications of the type disclosed in Figure 12. In this latter figure the rigid core 109 incorporates the annular chamber 110 which is in communication with a plurality of spaced-apart pockets 111 on the upper surface of the core by means of a plurality of holes 112. In all other respects the construction of the valve member is similar to that described in reference to Figure 9 but in this case it will be apparent that the flexing areas 113 of the elastomer covering 114 act to dislodge collected material from between the diaphragm supporting members 115. The flexing areas or webs 113 extend between the diaphragm supporting members 115 so that the latter are firm in their support of the diaphragm.

Figure 13:
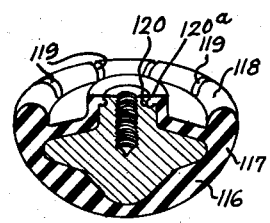
Figure 13 is a sectional perspective view of a further modified form of valve member having means rising from the upper surface thereof for a clearing function.

A further alternative is illustrated in Figure 13 with reference to the specific form of diaphragm supporting member employed. In this case the rigid core 116 having an elastomer covering 117, has a plurality of diaphragm supporting members 118 arranged in annular peripheral form and spaced apart by passageways or slots 119. This form of valve member may, of course, include the pneumatic feature described with reference to the forms of Figures 10 and 12, and preferably would embody some means of locking the covering to the rigid core, such as suitable indentations (not shown) in the rigid core whereby the covering would be locked thereto, or the radiused recess 120 above which is formed an annular sealing face 120a in the elastomer covering thereby providing a necessary sealing function on assembly of the valve with the diaphragm and ram components and also at the same time insuring a locking of the covering to the rigid core.

Figure 8:
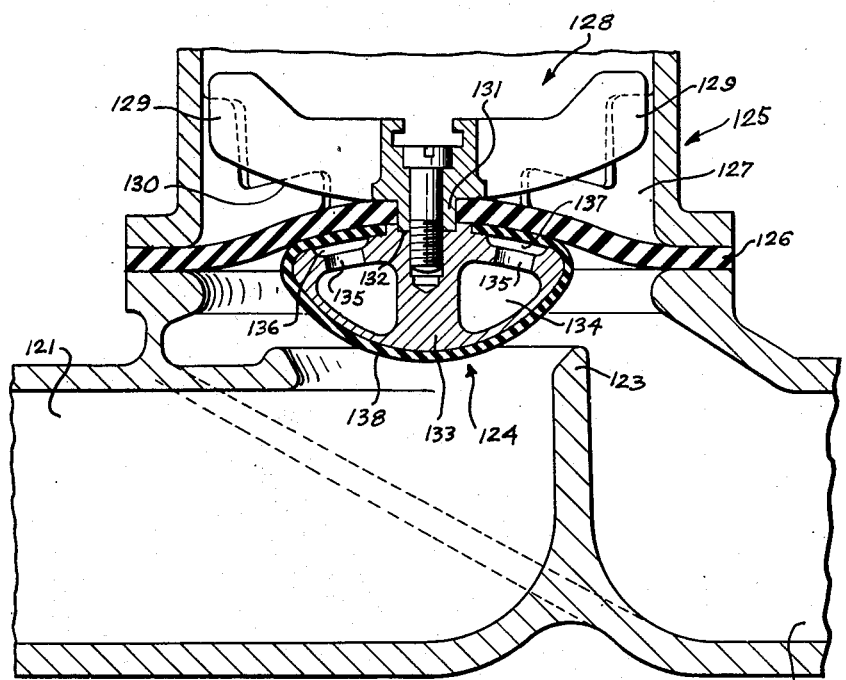
Figure 8 is a sectional view of a further modification of a valve member according to the invention mounted within the valve of the through type partially shown. In this case the valve member is of the type having free flexing areas.

The associated components of the valve may be of slightly modified form in accordance with the teachings of my prior applications referred to. Thus in Figure 8 a through type of valve having a valve body with inlet and outlet openings 121 and 122 separated by the valve nozzle 123, acted upon by the valve member 124, carries a modified form of bonnet structure 125 clamping the diaphragm 126 thereto. In order to support the diaphragm in the open position the interior of the bonnet 125 is provided with inwardly directed webs 127, the lower surfaces of which are concave as shown, for supporting the outer side of the diaphragm 126 against pressure within the valve when the valve member 124 is in the open position. In this design the follower plate or follower member 129 is in the form of an independent component and has radially extending arms 129 having arcuate surfaces 130 designed to engage the upper surface of the diaphragm 126 when the valve is in the closed position. The follower member is assembled with the diaphragm and valve member substantially as previously illustrated with the exception that it will be noted that what was formerly referred to as the pressure limiting bushing takes the form of a projection 131 extending downwardly from the central region of the follower member to engage the annular seat 132 in the rigid core 133 of the valve member. The core 133 of the valve member has an annular chamber 134 communicating by way of suitable holes 135 to an annular recess 136 to provide flexible webs 137 in the elastomer coating 134 in the manner previously described with reference to the valve forms of Figures 10 and 12. It will be obvious that the specific form of the chambers need not be adhered to and that a simple annular chamber of limited depth underlying the covering in the upper region of the valve to retain any suitable compressible medium would be satisfactory in accordance with the principle outlined herein.

It will be appreciated that the valve member of the invention is capable of various forms as illustrated and described herein and yet further alternatives and modifications will be apparent to skilled persons which would not depart from the spirit of the invention. In order to clearly set forth the factors involved in the design of a valve member according to the invention, various specific structures have been described in detail. It is desired that the descriptions and illustrations herein should not be construed in any limiting sense apart from that which may be indicated by the scope of the following claims.

What I claim as my invention is:

1. A valve member for a diaphragm valve comprising a rigid core, a centrally located, threaded recess in said core to enable said member to be mounted in a valve and to be locked to a diaphragm at its center, a rigid, narrow, annular pressure limiting seat formed about said recess, an annular recess formed in said rigid core immediately adjacent said annular pressure limiting seat, said seat being between said threaded recess and said annular recess, an elastomer envelope on said core terminating around said pressure limiting seat whereby said core is completely sealed by said envelope when assembled in said valve, and an inverted frustro-conical recess formed by said envelope about said pressure limiting seat, a portion of said envelope extending inwardly to said annular recess to lock the envelope to said core.

2. A valve member for a diaphragm valve comprising a rigid core having means to enable said member to be mounted in a valve and to be locked to a diaphragm at its center, a hollow chamber formed in said core in open communication with the upper face thereof, an annular, rigid, pressure-limiting seat formed about said mounting means, an elastomer covering extending about said rigid core and over the upper face thereof to terminate in an annular sealing face formed about said pressure limiting seat and said mounting means, the portion of the covering extending over the upper core surface in communication with said hollow chamber constituting a flexible web.

3. A valve member in accordance with claim 2 including upstanding spaced members formed on the outer surface of that portion of the flexible web overlying the upper core surface.

4. A valve member for a diaphragm valve comprising a rigid core having a centrally located threaded recess to enable said member to be mounted in a valve and to be locked to a diaphragm at its center, a narrow, annular, pressure limiting seat immediately adjacent said recess, and an annular recess surrounding said seat, said core being enveloped by a cover of material differing from that of the core and capable of being extruded, said core having a plurality of channels positioned intermediate its outermost periphery and central axis and extending from one surface to another of said core, said material being extruded into said channels to form a plurality of bonding anchors connecting integrally with the material enveloping the core to form a homogeneously fused and mechanically tenacious bond between said extruded anchors and the enveloping material, said material substantially completely enveloping said core except for the aforesaid seat and threaded recess, a portion of the envelope extending inwardly to said annular recess to form a cavity about said seat.

5. A valve member for a diaphragm valve comprising a hollow, rigid core, said core having means to enable said member to be mounted in a valve and to be locked to a diaphragm at its center, said member having a semi-spherical seat-engaging surface and a substantially convex diaphragm-supporting surface opposite thereto, said core being covered with a resilient covering extending to a locus adjacent the aforesaid means, said core being formed with orifices in its diaphragm-supporting surface to provide substantial inwardly flexible areas of the covering.

6. A valve member for a diaphragm valve comprising a hollow, rigid core, said core having means to enable said member to be mounted in a valve and to be locked to a diaphragm at its center, said member having a semi-spherical seat-engaging surface and a substantially convex diaphragm-supporting surface opposite thereto, said member having a rigid core formed with a hollow interior in communication with an annular channel on the diaphragm-supporting surface, a resilient covering on said core extending to a locus adjacent said means, and overlying said channel whereby to provide a substantial inwardly flexible area of said covering.

7. A valve member for a diaphragm valve comprising a rigid core, a threaded recess in said core to enable said member to be mounted in a valve and to be locked to a diaphragm at its center, a shallow annular recess in said core formed about the outer end of said threaded recess, and a covering of chemically resistant material extending about said rigid core and terminating at said annular recess.

8. A valve member for a diaphragm valve comprising a rigid core, a recess in said core having a smaller diameter threaded hole at its base extending to the central portion of said core, the outer end of said threaded hole being surrounded by a rigid annular seat, and a covering of chemically resistant material, different from said core, extending about said rigid core and terminating around said seat to form thereabove an annular socket-like formation in the recess of said core.

9. A valve member in accordance with claim 7 in which the annular recess extends above the threaded recess and the covering material extends into said recess to lock the covering to the core.

RONALD FORTUNE.

References Cited in the file of this patent

UNITED STATES PATENTS

| Number | Name | Date |
|---|---|---|
| 157,046 | Weinman | Nov. 17, 1874 |
| 222,727 | Peck | Dec. 16, 1879 |
| 268,025 | Kelly | Nov. 28, 1882 |
| 863,449 | Richardson | Aug. 13, 1907 |
| 983,144 | Jurgensen | Jan. 31, 1911 |
| 1,352,735 | Egerton | Sept. 14, 1920 |
| 1,632,418 | Ruegg | June 14, 1927 |
| 1,653,202 | Bulba | Dec. 20, 1927 |
| 1,820,951 | Slick | Sept. 1, 1931 |
| 1,893,859 | Gleason | Jan. 10, 1933 |
| 1,923,306 | Hagen | Aug. 22, 1933 |
| 2,181,900 | Langdon | Dec. 5, 1939 |
| 2,285,343 | Marchand | June 2, 1942 |